United States Patent
Chen

(10) Patent No.: US 12,308,634 B2
(45) Date of Patent: May 20, 2025

(54) MOTOR DRIVER CIRCUIT HAVING REVERSE CURRENT DETECTION MECHANISM

(71) Applicant: ANPEC ELECTRONICS CORPORATION, Hsinchu (TW)

(72) Inventor: Kun-Min Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 115 days.

(21) Appl. No.: 18/453,270

(22) Filed: Aug. 21, 2023

(65) Prior Publication Data

US 2024/0421588 A1 Dec. 19, 2024

(30) Foreign Application Priority Data

Jun. 14, 2023 (TW) ................. 112122090

(51) Int. Cl.
*H02P 7/03* (2016.01)
*H02H 7/08* (2006.01)
*H02P 7/29* (2016.01)

(52) U.S. Cl.
CPC ............ *H02H 7/0844* (2013.01); *H02P 7/04* (2016.02); *H02P 7/29* (2013.01)

(58) Field of Classification Search
CPC ............ H02H 7/0844; H02P 7/29; H02P 7/04
USPC .................................................. 318/400.21
See application file for complete search history.

(56) References Cited

U.S. PATENT DOCUMENTS

| 6,060,859 | A  | * | 5/2000 | Jonokuchi | B60L 3/06 318/811 |
| 6,879,128 | B2 | * | 4/2005 | Coutu | H02P 8/12 318/599 |
| 2005/0007050 | A1 | * | 1/2005 | Brenden | H02P 6/14 318/400.38 |
| 2007/0221997 | A1 | * | 9/2007 | Chen | H02P 7/04 257/379 |
| 2017/0170719 | A1 | * | 6/2017 | Bang | H02M 3/33584 |

FOREIGN PATENT DOCUMENTS

TW 201110532 A1 3/2011
TW I629867 B 7/2018

* cited by examiner

*Primary Examiner* — Gabriel Agared
(74) *Attorney, Agent, or Firm* — Li & Cai Intellectual Property Office

(57) ABSTRACT

A motor driver circuit having a reverse current detection mechanism is provided. The motor driver circuit includes a reverse current detector circuit, a control circuit, a driver circuit and an output stage circuit. The reverse current detector circuit detects a current flowing through a motor within a preset time interval to output a current detected signal. The control circuit determines whether or not the detected current is a reverse current to output a control signal according to the current detected signal. The driver circuit outputs a driving signal according to the control signal. The output stage circuit operates to output an output-stage signal to the motor according to the driving signal. The motor rotates according to the output-stage signal.

13 Claims, 8 Drawing Sheets

MOTOR DRIVER CIRCUIT HAVING REVERSE CURRENT DETECTION MECHANISM

CROSS-REFERENCE TO RELATED PATENT APPLICATION

This application claims the benefit of priority to Taiwan Patent Application No. 112122090, filed on Jun. 14, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driver circuit, and more particularly to a motor driver circuit having a reverse current detection mechanism.

BACKGROUND OF THE DISCLOSURE

Circuit components of electronic products produce heat during operation, by which air circulated throughout an enclosed space, especially in an enclosed chassis of a server, is heated up. As a result, other circuit components can be damaged due to overheating. Therefore, fans must be disposed in the electronic products and used to cool down the circuit components of the electronic products.

However, when a control circuit controls a plurality of transistors of a motor driver circuit to drive the rotation of a motor in the fan, so as to drive blades of the fan to rotate, a reverse current flows through the motor and the plurality of transistors of the motor driver circuit, which affects the rotation of the motor of the fan.

SUMMARY OF THE DISCLOSURE

In response to the above-referenced technical inadequacies, the present disclosure provides a motor driver circuit having a reverse current detection mechanism. The motor driver circuit is applicable to a motor. The motor driver circuit includes a reverse current detector circuit, a control circuit, a driver circuit and an output stage circuit. The reverse current detector circuit is connected to the motor. The reverse current detector circuit is configured to detect a current flowing through the motor to output a current detected signal within a preset time interval. The control circuit is connected to the reverse current detector circuit. The control circuit is configured to determine whether or not the current flowing through the motor is a reverse current according to the current detected signal from the reverse current detector circuit to determine a control signal. The control circuit is configured to output the control signal. The driver circuit is connected to the control circuit. The driver circuit is configured to output a driving signal according to the control signal from the control circuit. The output stage circuit is connected to the driver circuit and the motor. The output stage circuit is configured to operate to output an output-stage signal to the motor according to the driving signal. The motor rotates according to the output-stage signal from the output stage circuit.

In certain embodiments, the output stage circuit includes a plurality of high-side transistors and a plurality of low-side transistors. The plurality of high-side transistors includes a first high-side transistor and a second high-side transistor. A first terminal of the first high-side transistor and a first terminal of the second high-side transistor are coupled to a common voltage. The plurality of low-side transistors includes a first low-side transistor and a second low-side transistor. A first terminal of the first low-side transistor is connected to a second terminal of the first high-side transistor. A first terminal of the second low-side transistor is connected to a second terminal of the second high-side transistor. A second terminal of the first low-side transistor and a second terminal of the second low-side transistor are grounded. Control terminals of the plurality of high-side transistors and the plurality of low-side transistors are connected to an output terminal of the driver circuit. A first terminal of the motor is connected to a node between the first terminal of the first low-side transistor and the second terminal of the first high-side transistor. A second terminal of the motor is connected to a node between the first terminal of the second low-side transistor and the second terminal of the second high-side transistor.

In certain embodiments, when the control circuit determines that the reverse current flows through the motor, the control circuit controls the driver circuit to turn off any one of the plurality of low-side transistors.

In certain embodiments, the driver circuit continually turns off the one of the plurality of low-side transistors for a period of time. When the period of time ends and the motor commutates, the driver circuit starts to alternatively turn on the plurality of high-side transistors and the plurality of low-side transistors.

In certain embodiments, the reverse current detector circuit is connected to a first terminal, a second terminal and/or a third terminal of the motor. The reverse current detector circuit detects a voltage of the first terminal of the motor, a voltage of the second terminal of the motor and/or a voltage of the third terminal of the motor. The control circuit determines whether or not the reverse current flows through the motor according to the voltage of the first terminal of the motor, the voltage of the second terminal of the motor and/or the voltage of the third terminal of the motor.

In certain embodiments, the reverse current detector circuit is connected to a first terminal, a second terminal and/or a third terminal of the motor. The reverse current detector circuit detects a voltage of the first terminal of the motor, a voltage of the second terminal of the motor and/or a voltage of the third terminal of the motor. The control circuit compares the voltage of the first terminal of the motor, the voltage of the second terminal of the motor and/or the voltage of the third terminal of the motor with a reference voltage to determine whether or not the reverse current flows through the motor.

In certain embodiments, the reverse current detector circuit is connected to an anode or a cathode of a body diode of any one of the plurality of low-side transistors. The reverse current detector circuit detects a current flowing through the body diode of the one of the plurality of low-side transistors. The control circuit determines whether or not the reverse current flows through the motor according to the current detected by the reverse current detector circuit.

In certain embodiments, the reverse current detector circuit is connected to an anode and a cathode of a body diode of any one of the plurality of low-side transistors. The reverse current detector circuit is configured to detect a voltage of the body diode of the one of the plurality of low-side transistors. The control circuit determines whether or not the body diode is conducted according to the voltage of the body diode of the one of the plurality of low-side transistors that is detected by the reverse current detector circuit, and accordingly determines whether or not the reverse current flows through the motor.

In certain embodiments, the reverse current detector circuit is connected to an anode and a cathode of a body diode of any one of the plurality of low-side transistors. The reverse current detector circuit detects a voltage of the body diode of the one of the plurality of low-side transistors. The reverse current detector circuit calculates a voltage difference between the voltage of the body diode of the one of the plurality of low-side transistors and a reference voltage. The control circuit determines whether or not the reverse current flows through the motor according to the voltage difference between the voltage of the body diode of the one of the plurality of low-side transistors and the reference voltage.

In certain embodiments, the reverse current detector circuit is connected to a first terminal and a second terminal of any one of the plurality of low-side transistors. The reverse current detector circuit detects voltages of the first terminal and the second terminal of the one of the plurality of low-side transistors. The reverse current detector circuit calculates a voltage difference between the voltage of the first terminal of the one of the plurality of low-side transistors and the voltage of the second terminal of the one of the plurality of low-side transistors. The control circuit determines whether or not the reverse current flows through the motor according to the voltage difference from the reverse current detector circuit.

In certain embodiments, the reverse current detector circuit includes an operational amplifier. A first input terminal of the operational amplifier is coupled to a voltage difference between a voltage of an anode of a body diode of any one of the plurality of low-side transistors and a voltage of a cathode of the body diode of the one of the plurality of low-side transistors. A second input terminal of the operational amplifier is coupled to a reference voltage. An output terminal of the operational amplifier is connected to an input terminal of the control circuit. The control circuit determines whether or not the reverse current flows through the motor according to an operation amplified signal from the operational amplifier.

In certain embodiments, the reverse current detector circuit includes an operational amplifier. A first input terminal of the operational amplifier is coupled to a first terminal, a second terminal or a third terminal of the motor. A second input terminal of the operational amplifier is coupled to a reference voltage. An output terminal of the operational amplifier is connected to an input terminal of the control circuit. The control circuit determines whether or not the reverse current flows through the motor according to an operational amplified signal from the operational amplifier.

In certain embodiments, the motor is a single motor.

In certain embodiments, the motor is a three-phase motor.

In certain embodiments, the motor driver circuit further includes a rotor position detector circuit. The rotor position detector circuit is connected to the motor and the control circuit. The rotor position detector circuit is configured to detect a position of a rotor of the motor to output a rotor position detected signal. The control circuit controls the driver circuit according to the rotor position detected signal from the rotor position detector circuit.

As described above, the present disclosure provides the motor driver circuit having the reverse current detection mechanism. The motor driver circuit of the present disclosure determines whether or not the reverse current (that is a back electromotive force current) flowing through the motor within the preset time interval. When the motor driver circuit of the present disclosure determines that the reverse current flows through the motor, the low-side transistor (and the high-side transistor) of the motor driver circuit of the present disclosure is switched, thereby preventing abnormal rotation and noise from occurring in the motor that are caused by the reverse current flowing through the motor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
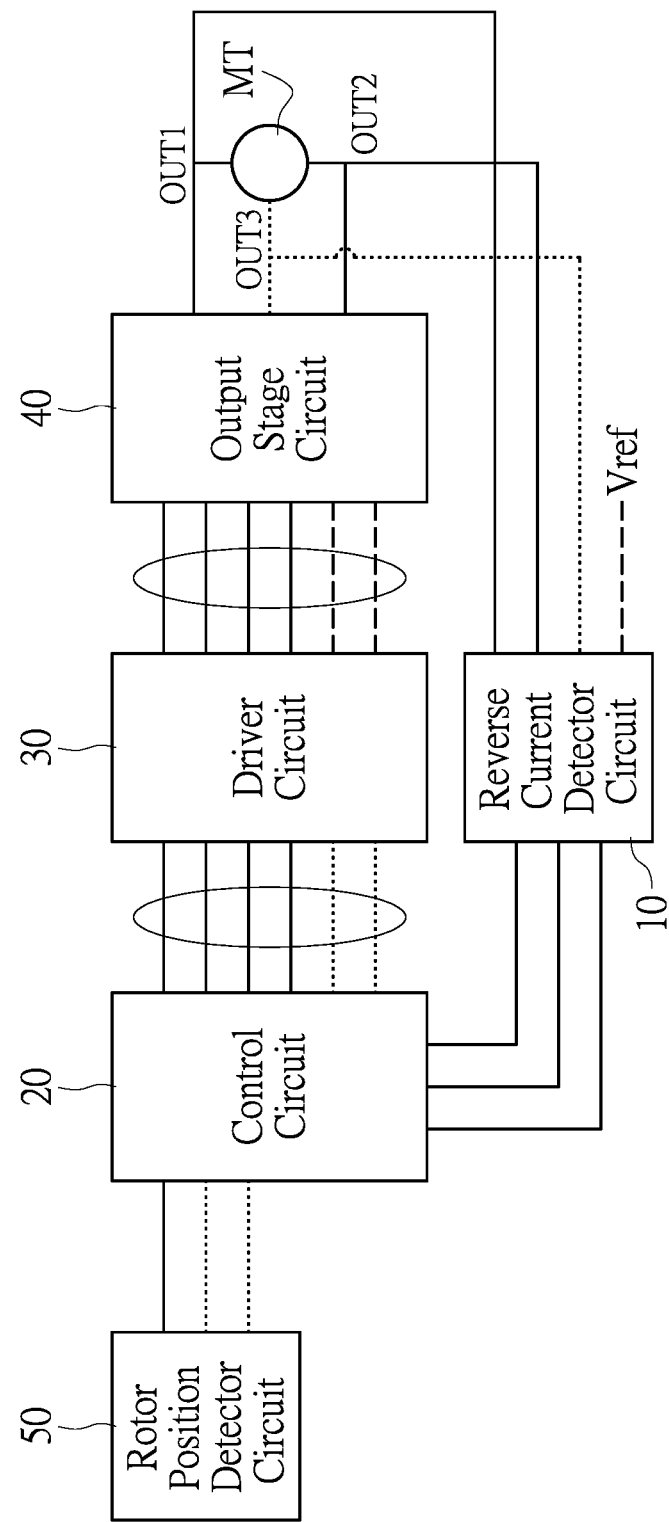
FIG. 1 is a block diagram of a motor driver circuit having a reverse current detection mechanism according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
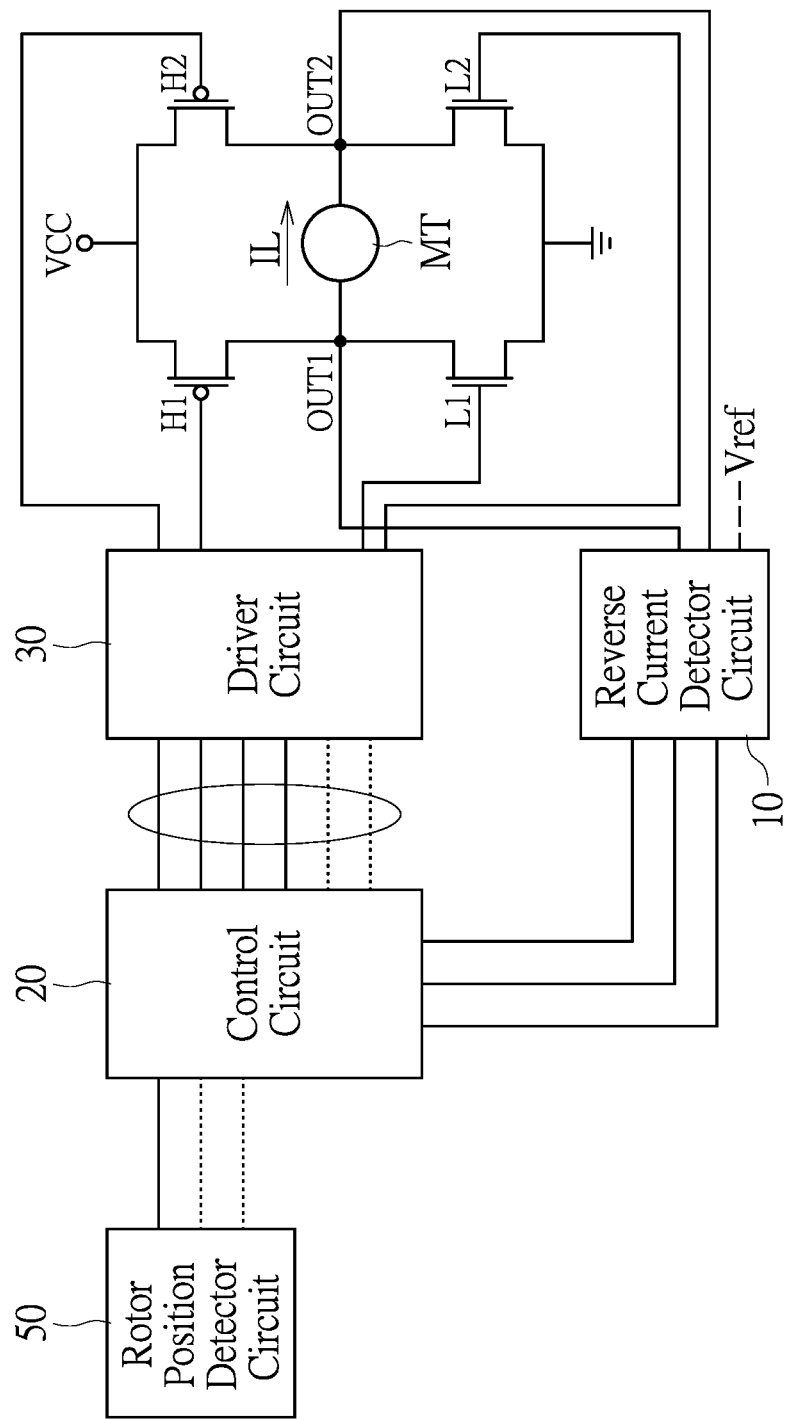
FIG. 2 is a circuit diagram of the motor driver circuit having the reverse current detection mechanism according to the embodiment of the present disclosure.
Figure 4:
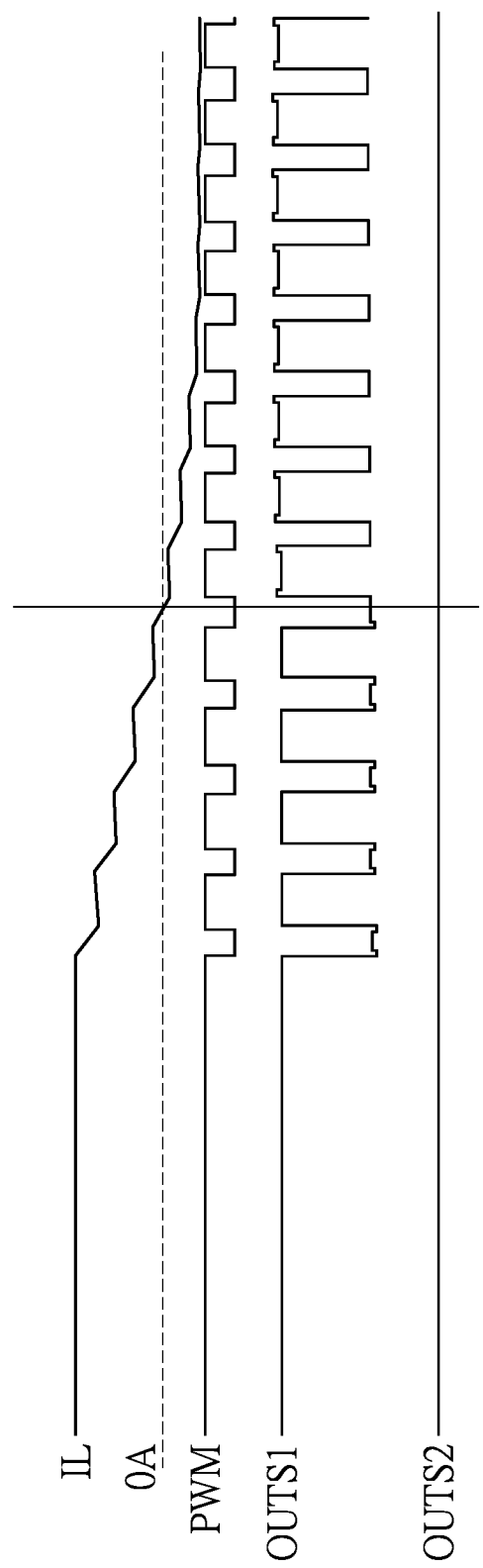
FIG. 4 is a waveform diagram of signals of the motor driver circuit having the reverse current detection mechanism according to the embodiment of the present disclosure.

Reference is made to FIGS. 1, 2 and 4, in which FIG. 1 is a block diagram of a motor driver circuit having a reverse current detection mechanism according to an embodiment of the present disclosure, FIG. 2 is a circuit diagram of the motor driver circuit having the reverse current detection mechanism according to the embodiment of the present disclosure, and FIG. 4 is a waveform diagram of signals of the motor driver circuit having the reverse current detection mechanism according to the embodiment of the present disclosure.

The motor driver circuit of the present disclosure is applicable to a motor MT such as a single motor or a three-phase motor.

The motor driver circuit of the present disclosure includes a reverse current detector circuit 10, a control circuit 20, a driver circuit 30 and an output stage circuit 40 as shown in FIG. 1. If necessary, the motor driver circuit of the present disclosure may further include a rotor position detector circuit 50 as shown in FIG. 1.

The reverse current detector circuit 10 is connected to the motor MT. The control circuit 20 is connected to the reverse current detector circuit 10, the driver circuit 30 and the rotor position detector circuit 50. The output stage circuit 40 is connected to the driver circuit 30 and the motor MT.

The output stage circuit 40 may include a plurality of high-side transistors such as a first high-side transistor H1 and a second high-side transistor H2 as shown in FIG. 2, and a plurality of low-side transistors such as a first low-side transistor L1 and a second low-side transistor L2 as shown in FIG. 2.

As shown in FIG. 2, a first terminal of the first high-side transistor H1 and a first terminal of the second high-side transistor H2 are coupled to a common voltage VCC. A first terminal of the first low-side transistor L1 is connected to a second terminal of the first high-side transistor H1. A first terminal of the second low-side transistor L2 is connected to a second terminal of the second high-side transistor H2. A second terminal of the first low-side transistor L1 and a second terminal of the second low-side transistor L2 are grounded.

As shown in FIG. 2, a first terminal OUT1 of the motor MT is connected to a node between the first terminal of the first low-side transistor L1 and the second terminal of the first high-side transistor H1. A second terminal OUT2 of the motor MT is connected to a node between the first terminal of the second low-side transistor L2 and the second terminal of the second high-side transistor H2. For example, a signal at the first terminal OUT1 of the motor MT may be a first signal OUTS1 as shown in FIG. 4 and a signal at the second terminal OUT2 of the motor MT may be a second signal OUTS2 as shown in FIG. 4. In practice, the signal at the first terminal OUT1 of the motor MT and the signal at the second terminal OUT2 of the motor MT may be changed according to actual requirements.

If the motor MT is the three-phase motor, a third terminal OUT3 of the motor MT as shown in FIG. 1 may be connected to the output stage circuit 40, and the output stage circuit 40 further includes a third high-side transistor and a third low-side transistor. The third terminal OUT3 of the motor MT is connected to a node between a second terminal of the third high-side transistor and a first terminal of the third low-side transistor. A first terminal of the third high-side transistor is coupled to the common voltage VCC. The second terminal of the third high-side transistor is connected to the first terminal of the third low-side transistor. A second terminal of the third low-side transistor is grounded.

A control terminal of each of a plurality of transistors of the output stage circuit 40 (such as the first high-side transistor H1, the second high-side transistor H2, the first low-side transistor L1 and the second low-side transistor L2 as shown in FIG. 2) is connected to an output terminal of the driver circuit 30.

The control circuit 20 may control the driver circuit 30 to drive (the plurality of transistors such as the first high-side transistor H1, the second high-side transistor H2, the first low-side transistor L1 and the second low-side transistor L2 of) the output stage circuit 40 to operate so as to drive the motor MT to rotate (according to a rotor position detected signal that is outputted based on a position of a rotor of the motor MT detected by the rotor position detector circuit 50 and a pulse width modulation signal PWM as shown in FIG. 4).

When the motor MT rotates, the reverse current detector circuit 10 may detect a current IL flowing through the motor MT within a preset time interval to output a current detected signal to the control circuit 20. For example, after a period of time has elapsed since the motor MT commutates, the reverse current detector circuit 10 may detect the current IL flowing through the motor MT within the preset time interval to output the current detected signal to the control circuit 20.

If the motor MT being driven by the motor driver circuit of the present disclosure is the three-phase motor, the reverse current detector circuit 10 may detect a current flowing through the first terminal OUT1 (such as a U-phase terminal), the second terminal OUT2 (such as a V-phase terminal) and/or the third terminal OUT3 (such as a W-phase terminal) of the motor MT to output the current detected signal to the control circuit 20.

The control circuit 20 may, according to the current detected signal from the reverse current detector circuit 10, determine whether or not the current detected by the reverse current detector circuit 10 is the reverse current and accordingly determine or adjust a control signal outputted to the driver circuit 30.

The driver circuit 30, according to the control signal from the control circuit 20, outputs a driving signal to (the control terminals of each of the plurality of transistors such as the first high-side transistor H1, the second high-side transistor H2, the first low-side transistor L1 and the second low-side transistor L2 of) the output stage circuit 40.

The output stage circuit 40, specifically the plurality of transistors such as the first high-side transistor H1, the second high-side transistor H2, the first low-side transistor L1 and the second low-side transistor L2 thereof, operates to output an output stage signal to the motor MT, according to the driving signal from the driver circuit 30. The motor MT rotates according to the output stage signal from the output stage circuit 40.

Figure 3:
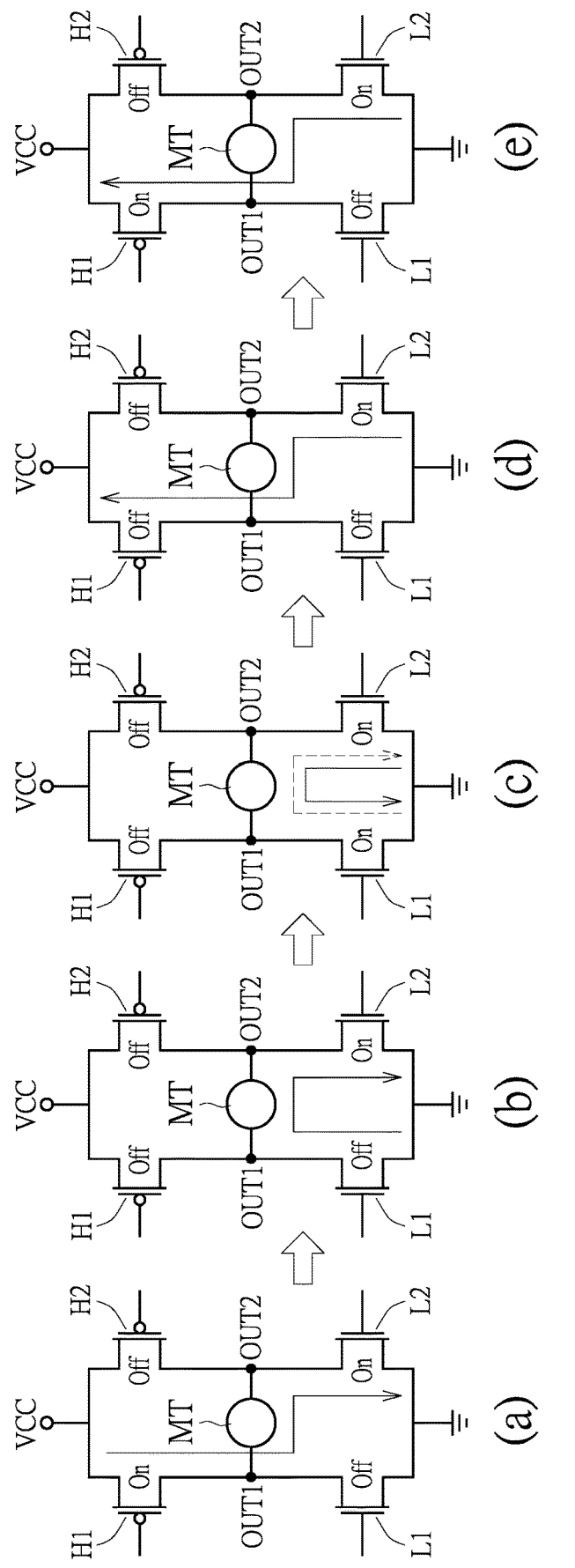
FIG. 3 is a schematic diagram of flowing directions of currents generated when a plurality of transistors of an output stage circuit of the motor driver circuit having the reverse current detection mechanism are switched according to the embodiment of the present disclosure.
Figure 5:
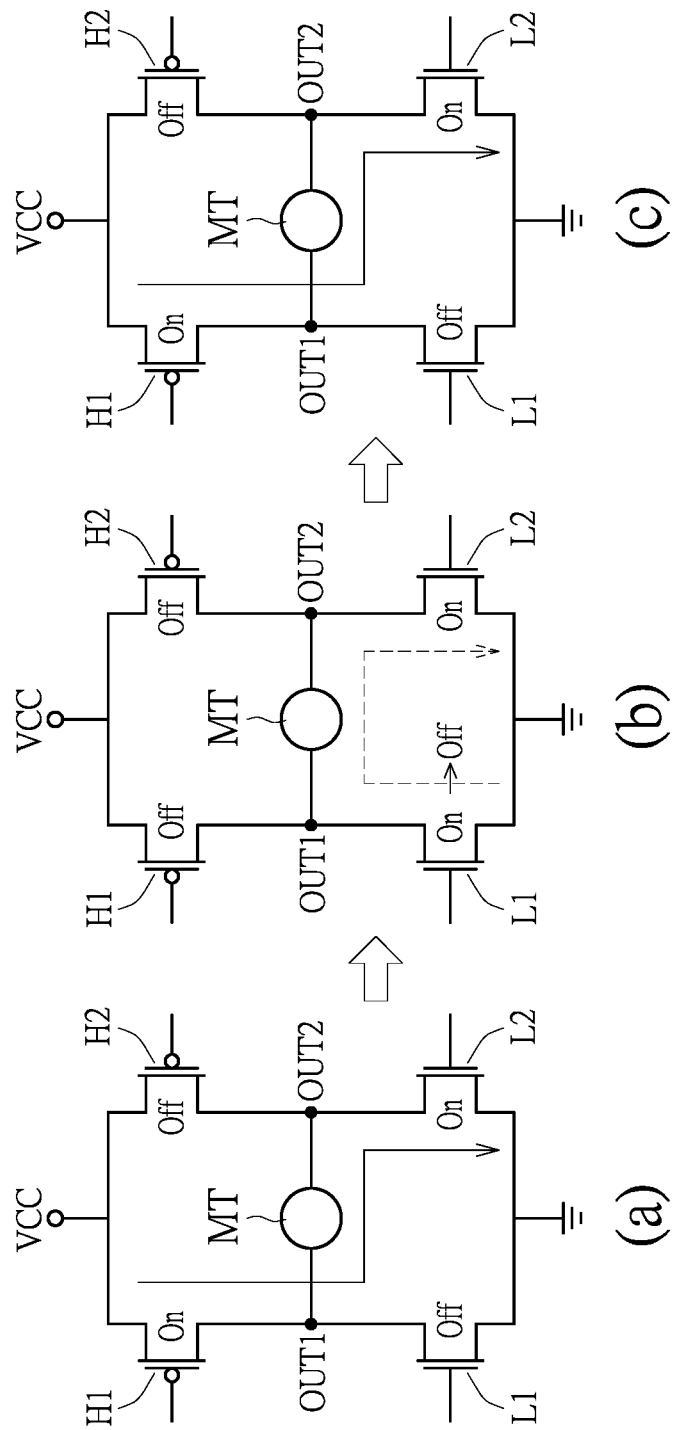
FIG. 5 is a schematic diagram of flowing directions of currents generated when the plurality of transistors of the output stage circuit of the motor driver circuit having the reverse current detection mechanism are switched according to the embodiment of the present disclosure.
Figure 6:
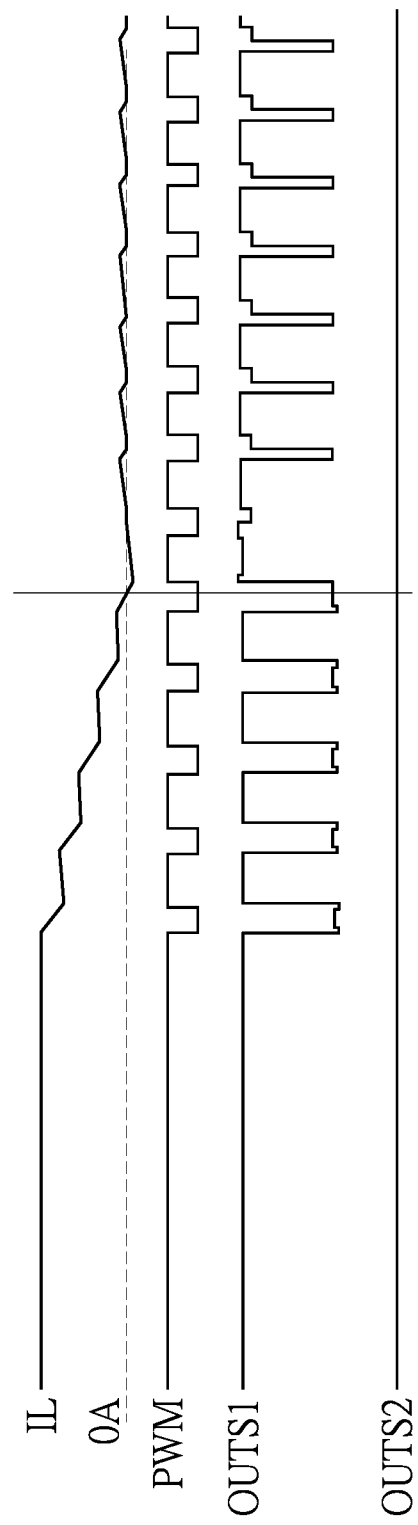
FIG. 6 is a waveform diagram of signals of the motor driver circuit having the reverse current detection mechanism according to the embodiment of the present disclosure.

Reference is made to FIGS. 2 to 6, in which FIG. 3 is a schematic diagram of flowing directions of currents generated when a plurality of transistors of an output stage circuit of the motor driver circuit having the reverse current detection mechanism are switched according to the embodiment of the present disclosure, FIG. 5 is a schematic diagram of flowing directions of currents generated when the plurality of transistors of the output stage circuit of the motor driver circuit having the reverse current detection mechanism are switched according to the embodiment of the present disclosure, and FIG. 6 is a waveform diagram of signals of the motor driver circuit having the reverse current detection mechanism according to the embodiment of the present disclosure.

The driver circuit 30 of the motor driver circuit of the present disclosure may complementarily switch the first high-side transistor H1 and the first low-side transistor L1 as shown in FIG. 3(a) to FIG. 3(c) or FIG. 5(a) to FIG. 5(b). That is, the driver circuit 30 switches the first low-side transistor L1 from an on state to an off state and switches the second low-side transistor L2 from the off state to the on state at the same time.

If the reverse current flows through the motor MT as marked by a solid arrow in FIG. 3(c) (for example, that is the current IL being smaller than a zero current value as shown in FIG. 4 or FIG. 6) when the first low-side transistor L1 and the second low-side transistor L2 are switched, the driver circuit 30 turns off the first low-side transistor L1 as shown in FIG. 3(d). As a result, a current sequentially flows through the second low-side transistor L2, the motor MT and the first high-side transistor H1 to the input voltage source supplying the common voltage VCC, thereby preventing the first low-side transistor L1 from being damaged due to overcurrent. Therefore, rotation of the motor MT driven by the motor driver circuit of the present disclosure is not affected by damage in the first low-side transistor L1.

When the control circuit 20 determines that the reverse current flows through the motor MT, the driver circuit 30 may turn off the first low-side transistor L1 for a period of time as shown in FIG. 3(d). When the period of time ends and the motor MT commutates, the control circuit 20 restarts to complementarily switch the first low-side transistor L1 and the first high-side transistor H1.

Figure 7:
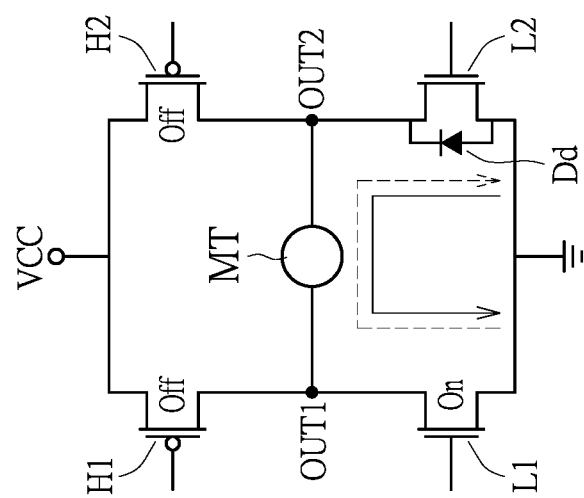
FIG. 7 is a schematic diagram of a reverse current flowing through a body diode of one of the plurality of transistors of the output stage circuit of the motor driver circuit having the reverse current detection mechanism according to the embodiment of the present disclosure.

Reference is made to FIGS. 2 and 7, in which FIG. 7 is a schematic diagram of a reverse current flowing through a body diode of one of the plurality of transistors of the output stage circuit of the motor driver circuit having the reverse current detection mechanism according to the embodiment of the present disclosure.

The reverse current detector circuit 10 may be connected to an anode (and a cathode) of the body diode of any one of the plurality of low-side transistors of the output stage circuit 40 such as, but not limited to, a body diode Dd of the second low-side transistor L2 as shown in FIG. 7.

The reverse current detector circuit 10 may detect a current flowing through the body diode Dd of the second low-side transistor L2 to output the current detected signal to the control circuit 20. The control circuit 20, according to the current detected signal from the reverse current detector circuit 10, determines whether or not the reverse current flows through the motor MT and accordingly determines the control signal outputted to the driver circuit 30.

In addition or alternatively, the reverse current detector circuit 10 may detect a voltage of the body diode Dd of the second low-side transistor L2. The control circuit 20 may, according to the voltage of the body diode Dd of the second low-side transistor L2 that is detected by the reverse current detector circuit 10, determine whether or not the reverse current flows through the motor MT and accordingly determine the control signal outputted to the driver circuit 30.

If necessary, the reverse current detector circuit 10 may compare the voltage of the body diode Dd as shown in FIG. 7 with a reference voltage, or calculate a difference between the voltage of the body diode Dd and the reference voltage, to determine whether or not the reverse current flows through the motor MT and accordingly determine the control signal outputted to the driver circuit 30.

Figure 8:
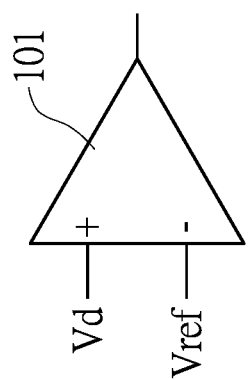
FIG. 8 is a circuit diagram of a reverse current detector circuit of the motor driver circuit having the reverse current detection mechanism according to the embodiment of the present disclosure.

Reference is made to FIGS. 2 and 8, in which FIG. 8 is a circuit diagram of a reverse current detector circuit of the motor driver circuit having the reverse current detection mechanism according to the embodiment of the present disclosure.

For example, the reverse current detector circuit 10 of the motor driver circuit of the present disclosure may include an operational amplifier 101 as shown in FIG. 8, but the present disclosure is not limited thereto.

A first input terminal such as a non-inverting input terminal of the operational amplifier 101 as shown in FIG. 8 may be connected to a first terminal (such as a drain terminal) and a second terminal (such as a source terminal) of any one of the plurality of low-side transistors (such as, but not limited to, the second low-side transistor L2 as shown in FIG. 7) of the output stage circuit.

Alternatively, the first input terminal such as the non-inverting input terminal of the operational amplifier 101 as shown in FIG. 8 may be connected to the anode (and the cathode) of the body diode (such as, but not limited to, the body diode Dd as shown in FIG. 7) of any one of the plurality of low-side transistors of the output stage circuit.

Alternatively, the first input terminal such as the non-inverting input terminal of the operational amplifier 101 as shown in FIG. 8 may be connected to one of a plurality of terminals such as the first terminal OUT1, the second terminal OUT2 and the third terminal OUT3 of the motor MT as shown in FIG. 1. In practice, the reverse current detector circuit 10 may include more operational amplifiers having first input terminals respectively connected to two other ones of the plurality of terminals of the motor MT such as the first terminal OUT1, the second terminal OUT2 and the third terminal OUT3.

A second input terminal such as a non-inverting input terminal of the operational amplifier 101 is coupled to a reference voltage Vref. An output terminal of the operational amplifier 101 is connected to an input terminal of the driver circuit 30.

The operational amplifier 101 multiplies a difference between a voltage of the first input terminal of the operational amplifier 101 and a voltage of the second input terminal of the operational amplifier 101 by a gain to output the operation amplified signal to the control circuit 20. The control circuit 20 may, according to the operation amplified signal from the operational amplifier 101, determine whether or not the reverse current flows through the motor MT and accordingly determine the control signal outputted to the driver circuit 30.

In conclusion, the present disclosure provides the motor driver circuit having the reverse current detection mechanism. The motor driver circuit of the present disclosure determines whether or not the reverse current (that is a back electromotive force current) is flowing through the motor within the preset time interval. When the motor driver circuit of the present disclosure determines that the reverse current flows through the motor, the low-side transistor (and the high-side transistor) of the motor driver circuit of the present disclosure is switched, thereby preventing abnormal rotation and noise from occurring in the motor that are caused by the reverse current flowing through the motor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driver circuit having a reverse current detection mechanism, which is applicable to a motor, comprising:
   a reverse current detector circuit connected to the motor, and configured to detect a current flowing through the motor to output a current detected signal within a preset time interval;
   a control circuit connected to the reverse current detector circuit, configured to determine whether or not the current flowing through the motor is a reverse current according to the current detected signal from the reverse current detector circuit to determine a control signal, and configured to output the control signal;
   a driver circuit connected to the control circuit and configured to output a driving signal according to the control signal from the control circuit; and
   an output stage circuit connected to the driver circuit and the motor, and configured to operate for outputting an output-stage signal to the motor according to the driving signal, wherein the motor rotates according to the output-stage signal from the output stage circuit;
   wherein the output stage circuit includes:
      a plurality of high-side transistors including a first high-side transistor and a second high-side transistor, wherein a first terminal of the first high-side transistor and a first terminal of the second high-side transistor are coupled to a common voltage; and
      a plurality of low-side transistors including a first low-side transistor and a second low-side transistor, wherein a first terminal of the first low-side transistor is connected to a second terminal of the first high-side transistor, a first terminal of the second low-side transistor is connected to a second terminal of the second high-side transistor, and a second terminal of the first low-side transistor and a second terminal of the second low-side transistor are grounded;
   wherein control terminals of the plurality of high-side transistors and the plurality of low-side transistors are connected to an output terminal of the driver circuit;
   wherein a first terminal of the motor is connected to a node between the first terminal of the first low-side transistor and the second terminal of the first high-side transistor;
   wherein a second terminal of the motor is connected to a node between the first terminal of the second low-side transistor and the second terminal of the second high-side transistor;
   wherein, when the control circuit determines that the reverse current flows through the motor, the control circuit controls the driver circuit to turn off any one of the plurality of low-side transistor.

2. The motor driver circuit according to claim 1, wherein the one of the plurality of low-side transistors is continually turned off by the driver circuit for a period of time, and when the period of time ends and the motor commutates, the driver circuit starts to alternatively turn on the plurality of high-side transistors and the plurality of low-side transistors.

3. The motor driver circuit according to claim 1, wherein the reverse current detector circuit is connected to a first terminal, a second terminal and/or a third terminal of the motor, the reverse current detector circuit detects a voltage of the first terminal of the motor, a voltage of the second terminal of the motor and/or a voltage of the third terminal of the motor, and the control circuit determines whether or not the reverse current flows through the motor according to the voltage of the first terminal of the motor, the voltage of the second terminal of the motor and/or the voltage of the third terminal of the motor.

4. The motor driver circuit according to claim 1, wherein the reverse current detector circuit is connected to a first terminal, a second terminal and/or a third terminal of the motor, the reverse current detector circuit detects a voltage of the first terminal of the motor, a voltage of the second terminal of the motor and/or a voltage of the third terminal of the motor, and the control circuit compares the voltage of the first terminal of the motor, the voltage of the second terminal of the motor and/or the voltage of the third terminal of the motor with a reference voltage to determine whether or not the reverse current flows through the motor.

5. The motor driver circuit according to claim 1, wherein the reverse current detector circuit is connected to an anode or a cathode of a body diode of any one of the plurality of low-side transistors, the reverse current detector circuit detects a current flowing through the body diode of the one of the plurality of low-side transistors, and the control circuit determines whether or not the reverse current flows through the motor according to the current detected by the reverse current detector circuit.

6. The motor driver circuit according to claim 1, wherein the reverse current detector circuit is connected to an anode and a cathode of a body diode of any one of the plurality of low-side transistors, the reverse current detector circuit detects a voltage of the body diode of the one of the plurality of low-side transistors;
   wherein the control circuit determines whether or not the body diode is conducted according to the voltage of the body diode of the one of the plurality of low-side transistors that is detected by the reverse current detector circuit, and accordingly determines whether or not the reverse current flows through the motor.

7. The motor driver circuit according to claim 1, wherein the reverse current detector circuit is connected to an anode and a cathode of a body diode of any one of the plurality of low-side transistors, the reverse current detector circuit detects a voltage of the body diode of the one of the plurality of low-side transistors, and the reverse current detector circuit calculates a voltage difference between the voltage of the body diode of the one of the plurality of low-side transistors and a reference voltage;

wherein the control circuit determines whether or not the reverse current flows through the motor according to the voltage difference between the voltage of the body diode of the one of the plurality of low-side transistors and the reference voltage.

8. The motor driver circuit according to claim 1, wherein the reverse current detector circuit is connected to a first terminal and a second terminal of any one of the plurality of low-side transistors, the reverse current detector circuit detects voltages of the first terminal and the second terminal of the one of the plurality of low-side transistors, the reverse current detector circuit calculates a voltage difference between the voltage of the first terminal of the one of the plurality of low-side transistors and the voltage of the second terminal of the one of the plurality of low-side transistors;

wherein the control circuit determines whether or not the reverse current flows through the motor according to the voltage difference from the reverse current detector circuit.

9. The motor driver circuit according to claim 1, wherein the reverse current detector circuit includes an operational amplifier, a first input terminal of the operational amplifier is coupled to a voltage difference between a voltage of an anode of a body diode of any one of the plurality of low-side transistors and a voltage of a cathode of the body diode of the one of the plurality of low-side transistors, a second input terminal of the operational amplifier is coupled to a reference voltage, and an output terminal of the operational amplifier is connected to an input terminal of the control circuit;

wherein the control circuit determines whether or not the reverse current flows through the motor according to an operation amplified signal from the operational amplifier.

10. The motor driver circuit according to claim 1, wherein the reverse current detector circuit includes an operational amplifier, a first input terminal of the operational amplifier is coupled to a first terminal, a second terminal or a third terminal of the motor, a second input terminal of the operational amplifier is coupled to a reference voltage, and an output terminal of the operational amplifier is connected to an input terminal of the control circuit;

wherein the control circuit determines whether or not the reverse current flows through the motor according to an operation amplified signal from the operational amplifier.

11. The motor driver circuit according to claim 1, wherein the motor is a single motor.

12. The motor driver circuit according to claim 1, wherein the motor is a three-phase motor.

13. The motor driver circuit according to claim 1, further comprising:

a rotor position detector circuit connected to the motor and the control circuit, and configured to detect a position of a rotor of the motor to output a rotor position detected signal, wherein the control circuit controls the driver circuit according to the rotor position detected signal.

* * * * *